United States Patent
Srinivas et al.

(10) Patent No.: US 11,443,168 B2
(45) Date of Patent: Sep. 13, 2022

(54) LOG ANALYSIS SYSTEM EMPLOYING LONG SHORT-TERM MEMORY RECURRENT NEURAL NET WORKS

(71) Applicant: EMC IP Holding Company LLC, Hopkinton, MA (US)

(72) Inventors: Vivek Srinivas, Karnataka (IN); Bhavna Jindal, Punjab (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 404 days.

(21) Appl. No.: 16/817,799

(22) Filed: Mar. 13, 2020

(65) Prior Publication Data

US 2021/0287068 A1    Sep. 16, 2021

(51) Int. Cl.
| | |
|---|---|
| *G06N 3/04* | (2006.01) |
| *G06N 3/08* | (2006.01) |
| *H04L 9/40* | (2022.01) |
| *G06K 9/62* | (2022.01) |
| *G06F 9/30* | (2018.01) |

(52) U.S. Cl.
CPC ....... *G06N 3/0454* (2013.01); *G06F 9/30036* (2013.01); *G06K 9/6251* (2013.01); *G06N 3/049* (2013.01); *G06N 3/08* (2013.01); *H04L 63/1425* (2013.01)

(58) Field of Classification Search
CPC ........ G06N 3/0454; G06N 3/049; G06N 3/08; G06N 3/0445; G06F 9/30036; G06F 11/0727; G06F 11/0751; G06F 11/0766; G06F 11/3476; G06K 9/6251; G06K 9/6271; G06K 9/6284; H04L 63/1425; G06V 10/82

See application file for complete search history.

(56) References Cited

U.S. PATENT DOCUMENTS

| | | | |
|---|---|---|---|
| 9,508,340 B2 | 11/2016 | Parada San Martin et al. | |
| 9,830,315 B1 | 11/2017 | Xiao et al. | |
| 10,558,750 B2 | 2/2020 | Lu et al. | |
| 2017/0063912 A1* | 3/2017 | Muddu | G06F 16/9024 |
| 2017/0262996 A1 | 9/2017 | Jain et al. | |
| 2020/0279157 A1 | 9/2020 | Gao et al. | |
| 2021/0019209 A1* | 1/2021 | Krishnaswamy | G06N 20/00 |
| 2021/0281592 A1* | 9/2021 | Givental | G06F 16/55 |
| 2022/0036154 A1* | 2/2022 | Yeddu | G06N 3/0445 |
| 2022/0114437 A1* | 4/2022 | Watt | H04L 65/80 |

* cited by examiner

*Primary Examiner* — Beemnet W Dada
(74) *Attorney, Agent, or Firm* — Bainwoodhuang

(57) ABSTRACT

System logs are processed to identify and report anomalies in execution of processes of a log-generating system such as a data storage system. Log messages of system logs are vectorized to generate log-message vectors; long short-term memory (LSTM) neural network processing is applied to the log-message vectors to generate an LSTM output sequence representing a production flow of the processes; and second-level neural network processing is applied to a combination of the LSTM output sequence and a training sequence to generate an analysis sequence containing a representation of anomalies in the production flow of the processes, where the training sequence is generated from a non-anomalous training flow. An anomaly report is generated and provided to a report consumer for taking further action with respect to the anomalies represented in the analysis sequence.

8 Claims, 3 Drawing Sheets

LOG ANALYSIS SYSTEM EMPLOYING LONG SHORT-TERM MEMORY RECURRENT NEURAL NET WORKS

BACKGROUND

The present invention is related to the field of data storage, and in particular to techniques for automated analysis of operational logs of from a data storage system or similar log source.

SUMMARY

Methods and apparatus are disclosed for processing system logs to identify and report anomalies in execution of one or more processes of a log-generating computerized system. A disclosed method includes vectorizing log messages of the system logs to generate corresponding log-message vectors; applying long short-term memory (LSTM) neural network processing to the log-message vectors to generate an LSTM output sequence representing a production flow of the processes; and applying second-level neural network processing to a combination of the LSTM output sequence and a training sequence to generate an analysis sequence containing a representation of anomalies in the production flow of the processes, the training sequence generated from a non-anomalous training flow of the processes. Based on the analysis sequence, an anomaly report is generated and provided to a report consumer for taking further action with respect to the anomalies represented in the analysis sequence.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Background and Overview

With the rate of increase in demand for efficient and economical cloud and hybrid storage, the complexity of data storage systems is also increasing. Increased demand for intelligent systems has an effect on the architectural design of the product and drives the development of the product; a result is an increased level of logging required to debug issues that can occur. A system may generate a truly large volume of logs, creating difficulties for engineers or other personnel trying to identify and correct operational issues. Furthermore, examining such a large amount of log messages to narrow down to a problematic code module itself can take a tremendous amount of time. Therefore, it becomes a necessity for an intelligent log analysis technology that can automatically narrow down the errors, reducing a developer's effort and the response time for identifying problems and providing solutions.

A disclosed technique is a solution that can be incorporated into a data storage system (or other intelligent system) that employs aspects of natural language processing (NLP) and deep learning technologies.

The log analyzer is an artificially intelligent feature, amalgamating NLP and deep learning technologies to address the above needs. At an analysis level, a system has capability to narrow down to a specific problem area by using system logs, thus resulting in lesser manual engineering effort which can be a huge savings in time and effort for both customers and product personnel.

In one aspect the technique employs a technology called word embedding, which is the use of a learned representation for text where words that have the same meaning have a similar representation. Word embeddings are a class of techniques where individual words are represented as real-valued vectors in a predefined vector space. Each word is represented by a real-valued vector, often tens or hundreds of dimensions. The distributed representation is learned based on the usage of words. This allows words that are used in similar ways to result in having similar representations, naturally capturing their meaning. In another aspect the technique also employs recurrent neural networks (RNNs), which are a class of artificial neural networks where connections between nodes form a directed graph along a temporal sequence. This allows an RNN to exhibit temporal dynamic behavior. Unlike feedforward neural networks, RNNs can use their internal state (memory) to process sequences of inputs. These features enable detection of anomalies in log message flows by using intelligent deep learning techniques, which can save an engineer's time in reading and interpreting logs.

Embodiments

Figure 1:
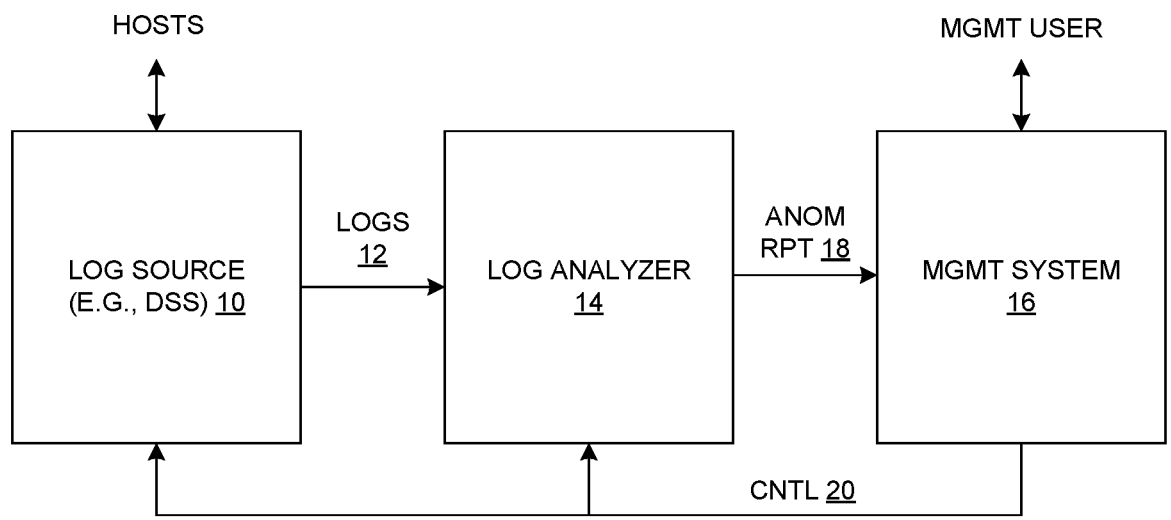
FIG. 1 is a block diagram of a data processing system including a log analyzer.

FIG. 1 is a block diagram of a data processing system having a first system 10 shown as a "log source", i.e., a source of operational logs 12 as briefly discussed above, a log analyzer 14, and a management (MGMT) system 16. In one embodiment the log source 10 is a data storage system (DSS) that provides data storage services to remote host computers (HOSTS), but it will be appreciated that the disclosed technique may be used with other types of log sources and in other application domains. In operation, the log analyzer 14 generates one or more anomaly reports (ANOM RPT) 18 based on the logs 12, and provides the report(s) 18 to the management system 16. The management system 16 may perform control functions and generate corresponding control signals (CNTL) 20 for the log source 10 and/or log analyzer 14, and it may also have an interface to a local or remote management user (MGMT USER). As explained below, in alternative embodiments an anomaly report(s) 18 may be used in other ways.

Without loss of generality, the remaining description refers to a single anomaly report 18. In an embodiment in which multiple distinct reports are generated concurrently, a collection of such concurrent reports may be viewed as a single logical report 18.

The log source 10, log analyzer 14, and management system 16 are all computerized systems having hardware structures as generally known in the art. The log analyzer 14 and management 16 may be realized as computer servers with specialized programming to provide functionality as described herein. When realized as a DSS, the log source 10 may include purpose-built hardware including a specialized storage processing complex, an array of data storage devices, and specialized interface circuitry for high-speed, storage-oriented interconnection with the hosts. In other cases the log source 10 may be realized as a specialized computerized device, specifically one that performs operational logging and makes the logs 12 available to the log analyzer 14.

In general the logs 12 contain streams of log messages pertaining to operations of the log source 10. One aspect of the log analyzer 14 is an ability to segregate log messages of different processes being performed concurrently at the log source 10 as reflected in the log messages, as described more below, and thus in general the log source 10 may be a complicated, modern computerized system having very complex, multi-threaded functionality (such as the example of a DSS). The anomaly report 18 identifies anomalies (deviations from normal operation) on a per-process basis. Illustrative examples are provided below. The management 16 may use the anomaly report 18 for taking further action with respect to the reported anomalies, such as alerting a system administrator, invoking an automated process for deeper analysis or corrective re-configuration (using control signals 20), etc. Additionally or instead, the report may be sent to engineers who can more quickly diagnose problems in operational code etc., with this whole process taking considerably less time compared to the scenario when the engineers have to go through a large volume of logs to just find the issue.

Figure 2:
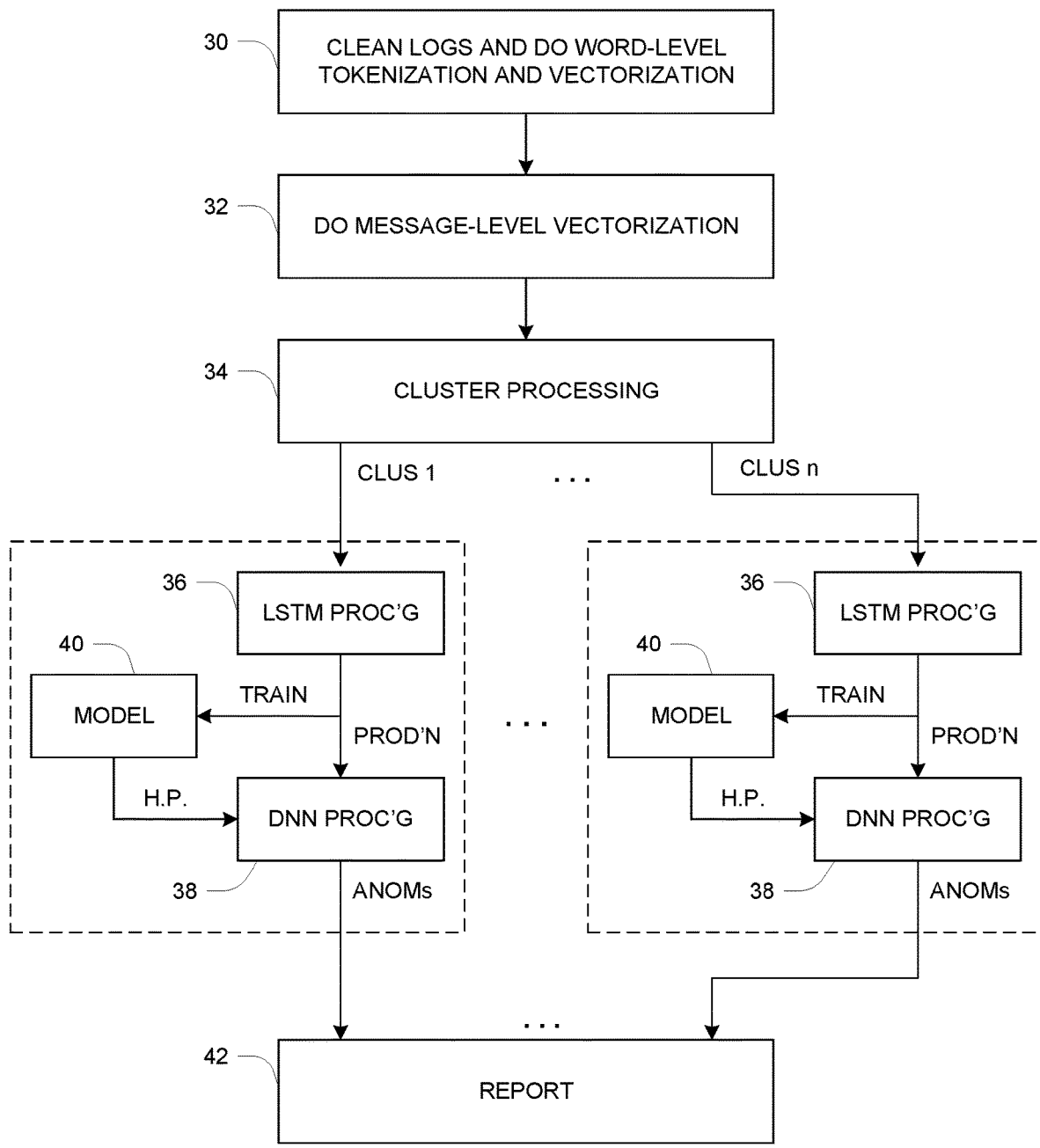
FIG. 2 is a flow diagram of log analysis processing.

FIG. 2 provides a flow diagram of operation of the log analyzer 14 at a high level. The illustrated processing may be initiated automatically or manually (e.g., invocation by a management user), and it may be performed periodically or more on demand, e.g., when an administrator or automated supervisor has a particular reason to perform log analysis. A core aspect is a multiple-level vectorization of log messages, followed by a certain type of neural-network processing using so-called Long Short-Term Memory (LSTM) networks. This processing provides certain benefits as described more below.

Thus in a first step 30, the log analyzer 14 first cleans the logs 12 to remove noise words such as "the", "of", etc., and then does a first-level (word-level) tokenization and vectorization of the remaining words in the log messages contained in the logs 12. The processing at 30 uses word embedding as described above. The output of step 30 is an alternative representation of the logs in which each log message is represented as a respective sequence of word vectors produced by the cleaning and word embedding. As a brief illustrative example, a log message "Filesystem is degrading" might be processed into two word vectors V1, V2, where V1 represents "filesystem" and V2 represents "degrading".

At 32, there is a second-level (message-level) vectorization of the sequence of word vectors of each log message, generating a respective log message vector for each distinct log message. This is essentially a set of representations of the log messages in a multi-dimensional vector space. Similar to the word-level vectorization, the messages become vectorized into respective vectors M1, M2, . . . in this multi-dimensional log-message space. One feature of this vectorization is that log messages that are apparently related, such as those belonging to the same process flow, tend to be clustered nearer to each other than to messages of other process flows. This clustering is exploited to extract distinct sequences of vectorized messages for the respective process flows. This is performed by cluster processing 34 which produces the sequences, shown as CLUS 1, . . . , CLUS n. An example of this clustering is provided below for illustration.

Each of the sequences CLUS 1, . . . , CLUS n is then processed in a multi-layer fashion to identify any anomalies that the sequence may contain. In one embodiment this processing includes LSTM-based processing (LSTM PROC'G) 36 followed by dense neural network processing (DNN PROC'G) 38, which generates anomaly indicators (ANOMs) when anomalies are present. These generally will be of the form of vectorized messages that either appear or do not appear unexpectedly (i.e., "extra" or "missing" messages). As shown, the DNN processing 38 obtains current or "production" (PROD'N) inputs from the LSTM processing 36 and "happy path" (H.P.) inputs from a model 40. The production inputs represent a production flow of the respective processes that may be anomalous, while the happy path inputs represent a training flow during a separate, non-anomalous execution of the same process, on which the model 40 has been trained. The DNN processing 38 operates to predict and report on the amount of deviation in the production flow of log messages from the happy path flow. After the model 40 has been trained on an ideal dataset, the DNN processing 38 is able to detect anomalies (deviations from normal log flow, which may reflect errors of interest) in the sequence of log messages from the production flow.

As shown, the anomaly indicators ANOMs from the DNN processing 38 for the various clusters is provided to a reporting function (or report generator) 42, which converts the anomaly indicators into corresponding anomaly reports in a format suitable for a report consumer. In one example, the reports are text files describing the anomalies, e.g., extra or missing log messages (actual messages, not message vectors). In another case, if the report is being consumed by an engineer, utilities like "cscope" can be used to identify the code path corresponding to the log messages.

Figure 3:
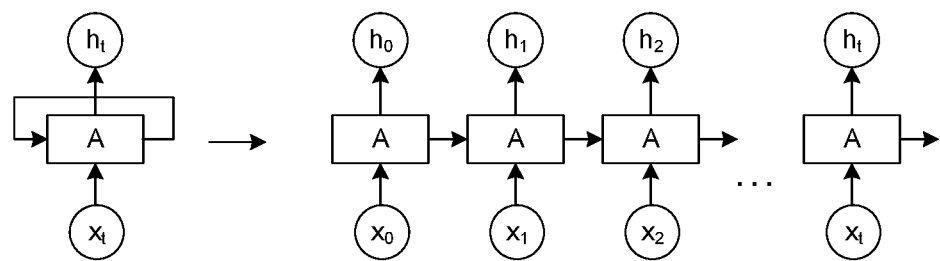
FIGS. 3-5 are schematic diagrams of recurrent neural networks (RNNs), including a long short-term memory (LSTM) variant shown in FIG. 5.
Figure 4:
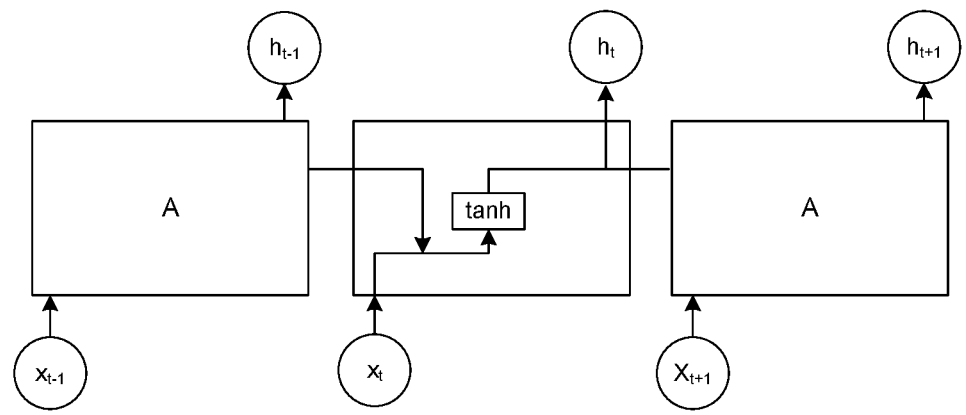
Figure 5:
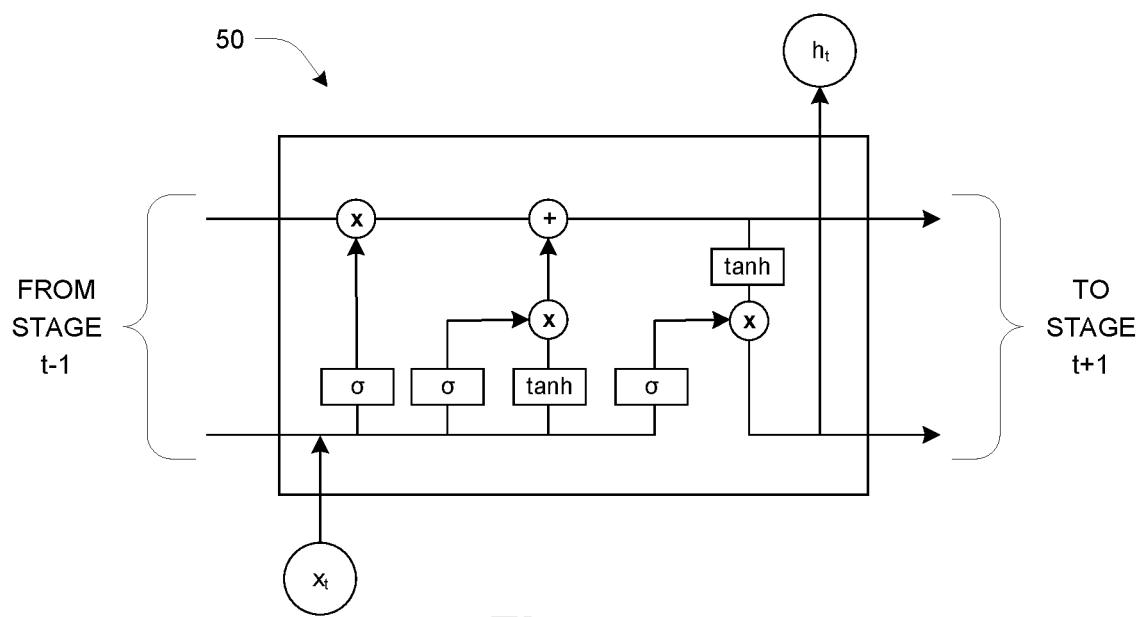

FIGS. 3-5 illustrate certain characteristics of recurrent neural networks (RNNs) and LSTMs in particular. FIG. 3 illustrates basic RNN structure, which is a cyclical repetition of a function A on a time series of input $x_t$ to generate a time series of output $h_t$, with each stage also receiving the output of the preceding stage as a second input. FIG. 3 shows a compact representation at left and an "unrolled" representation at right. FIG. 4 shows the basic per-stage processing, which in this example is a hyperbolic tangent (tan h) function of the current input $x_t$ and the preceding-stage output $h_{t-1}$.

FIG. 5 shows a single stage 50 of an LSTM, which is a special kind of RNN that is capable of learning long-term dependencies, incorporating features to mitigate the problem of vanishing gradient and thus increasing the accuracy of the output. Like the more generalized RNNs of FIGS. 3 and 4, an LSTM has the form of a chain of repeating modules of neural network, but the repeating module has a more specific structure. Instead of having a single neural network path or operation (such as single tan h), there are four paths/operations, and they interact in a special way. Specifically, an LSTM includes a cell, an input gate, an output gate and a "forget" gate. The cell remembers values over potentially long time periods, and the three gates regulate the flow of information into and out of the cell. This structure helps preserve the error that can be back propagated through time and layers. By maintaining a more constant error, LSTMs allow recurrent nets to continue to learn over many time steps (e.g., over 1000), thereby opening a channel to link causes and effects remotely. LSTMs contain information outside the normal flow of the recurrent network in a gated cell. Information can be stored in, written to, or read from the cell, much like data in a computer's memory. The cell makes decisions about what to store, and when to allow reads, writes and erasures, via gates that open and close. Unlike the digital storage on computers, however, these gates are analog, implemented with element-wise multiplication by sigmoids σ, which are all in the range of 0-1. Analog has the advantage over digital of being differentiable, and therefore suitable for backpropagation.

Example

Figure 6:
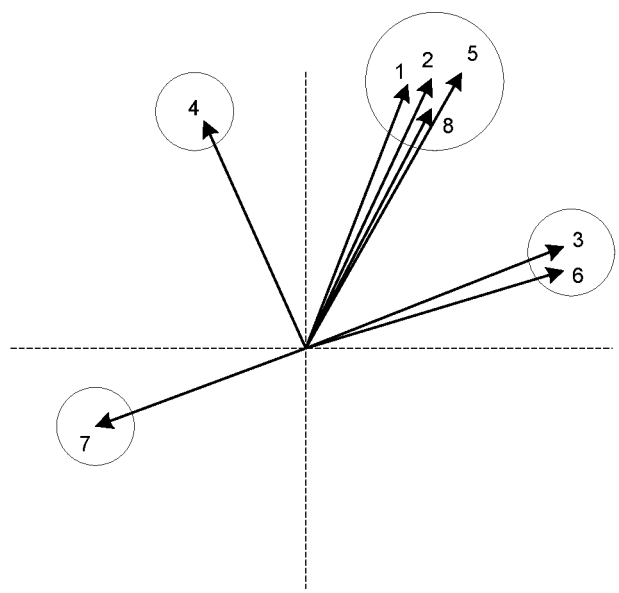
FIG. 6 is a simplified plot of vectorized log messages exhibiting clustering due to relatedness by source process.

An example is provided to illustrate the technique as described above. Reference is made to FIG. 6 which shows a representation of vectorized log messages in which the above-mentioned clustering is apparent (clustering indicated by circles).

Consider the below snippet in a log file, where each line is a log message generated by a respective process of the log generator 10 (in this case a DSS) at a respective time, with time progressing downward in this sequence. This example relates to logging of events in the processing of input/output (IO) commands which are directed to objects of a file system. The messages are tagged with numbers 1-8 to correlate them with the vectorized representation in FIG. 6.

> . . .
> The filesystem object 0x01 has received an IO. - - - 1
> The filesystem object 0x01 is processing IO. - - - 2
> The filesystem object 0x02 has received a delete request. - - - 3
> Host interface has received an abort request from the host. - - - 4
> The filesystem object 0x01 has completed processing the IO. - - - 5
> The filesystem object 0x02 is processing delete request. - - - 6
> Apache server failing over to standby due to received request. - - - 7
> The filesystem object 0x01 has completed processing the IO successfully, returning SUCCESS. - - - 8
> . . .

As described above, the first step is to tokenize the individual words in the log messages after cleaning them for commonly occurring words. This array of tokens is again tokenized which is essentially tokenizing each whole log message using only relevant word tokens. These message tokens are then represented in the form of multi-dimensional space vectors using the word embedding techniques as described above. As a result of vectorization, similar log messages are clustered near each other in the multi-dimensional space. In this example as shown in FIG. 6, four clusters appear: log messages 1, 2, 5, 8 in one cluster group (IO for 0x01), messages 3, 6 in another (IO for 0x02), and messages 4 (abort) and 7 (failover) in respective single-element "clusters". The cluster processing 34 intelligently groups log messages of the same process flows together and separates them from other flows, forming a solid data set for training and analysis using the LSTMs.

In one embodiment the log analyzer can be realized as a standalone system or tool such as described above, e.g., as a specialized server. In alternative embodiments, it may be integrated with the log source, and/or with a consumer of the anomaly reports such as a management system. In another aspect, the anomaly reports may alternatively be provided to a higher-level automated tool or process such as an analytics engine, classification engine, etc. for additional processing and use.

While various embodiments of the invention have been particularly shown and described, it will be understood by those skilled in the art that various changes in form and details may be made therein without departing from the spirit and scope of the invention as defined by the appended claims.

What is claimed is:

1. A method of processing system logs to identify and report anomalies in execution of one or more processes of a log-generating computerized system, comprising:

vectorizing log messages of the system logs to generate corresponding log-message vectors;

applying long short-term memory (LSTM) neural network processing to the log-message vectors to generate an LSTM output sequence representing a production flow of the processes;

applying second-level neural network processing to a combination of the LSTM output sequence and a training sequence to generate an analysis sequence containing a representation of anomalies in the production flow of the processes, the training sequence generated from a non-anomalous training flow of the processes; and based on the analysis sequence, generating an anomaly report and providing it to a report consumer for taking further action with respect to the anomalies represented in the analysis sequence.

2. The method of claim 1, wherein the vectorizing is a multiple-level vectorization including (1) a word-level tokenization and vectorization of individual words in the log messages, which produces a first representation in which each log message is represented as a respective sequence of word vectors, and (2) a message-level vectorization of the sequence of word vectors of each log message to generate a respective log-message vector for each distinct log message, the log-message vectors forming a set of representations of the log messages in a multi-dimensional log-message vector space.

3. The method of claim 2, wherein the log-message vectors produced by the multiple-level vectorization are segregated into respective clusters in the multi-dimensional log-message vector space, with each cluster containing log-message vectors for log messages belonging to a corresponding process flow, and further including cluster processing to extract distinct sequences of log-message vectors for the respective process flows and apply the sequences to respective LSTMs processing for detecting anomalies in the respective processes.

4. The method of claim 1, wherein the log-message vectors produced by the vectorizing are segregated into respective clusters in the multi-dimensional log-message vector space, with each cluster containing log-message vectors for log messages belonging to a corresponding process flow, and further including cluster processing to extract distinct sequences of log-message vectors for the respective process flows and apply the sequences to respective LSTMs processing for detecting anomalies in the respective processes.

5. A log analyzer system having memory and processing circuitry, the memory storing computer program instructions executed by the processing circuitry to process system logs to identify and report anomalies in execution of one or more processes of a log-generating computerized system, the processing of the system logs including:
  vectorizing log messages of the system logs to generate corresponding log-message vectors;
  applying long short-term memory (LSTM) neural network processing to the log-message vectors to generate an LSTM output sequence representing a production flow of the processes;
  applying second-level neural network processing to a combination of the LSTM output sequence and a training sequence to generate an analysis sequence containing a representation of anomalies in the production flow of the processes, the training sequence generated from a non-anomalous training flow of the processes; and
  based on the analysis sequence, generating an anomaly report and providing it to a report consumer for taking further action with respect to the anomalies represented in the analysis sequence.

6. The log analyzer system of claim 5, wherein the vectorizing is a multiple-level vectorization including (1) a word-level tokenization and vectorization of individual words in the log messages, which produces a first representation in which each log message is represented as a respective sequence of word vectors, and (2) a message-level vectorization of the sequence of word vectors of each log message to generate a respective log-message vector for each distinct log message, the log-message vectors forming a set of representations of the log messages in a multi-dimensional log-message vector space.

7. The log analyzer system of claim 6, wherein the log-message vectors produced by the multiple-level vectorization are segregated into respective clusters in the multi-dimensional log-message vector space, with each cluster containing log-message vectors for log messages belonging to a corresponding process flow, and further including cluster processing to extract distinct sequences of log-message vectors for the respective process flows and apply the sequences to respective LSTMs processing for detecting anomalies in the respective processes.

8. The log analyzer system of claim 5, wherein the log-message vectors produced by the vectorizing are segregated into respective clusters in the multi-dimensional log-message vector space, with each cluster containing log-message vectors for log messages belonging to a corresponding process flow, and further including cluster processing to extract distinct sequences of log-message vectors for the respective process flows and apply the sequences to respective LSTMs processing for detecting anomalies in the respective processes.

* * * * *